Patented May 8, 1928.

1,668,643

UNITED STATES PATENT OFFICE.

ALICE MARION HART, OF LONDON, ENGLAND, ASSIGNOR TO HART CARBON FUEL COMPANY LIMITED, OF LONDON, ENGLAND.

MANUFACTURE OF FUEL BRIQUETTES.

No Drawing. Application filed August 9, 1927, Serial No. 211,842, and in Great Britain April 22, 1926.

This invention relates to improvements in the manufacture of fuel briquettes by treating vegetable matter with sodium or potassium silicate to serve as an agglomerating agent, moulding and pressing the treated mass to the required shapes, and thereafter drying the shaped products in the air or by artificial heat.

I have discovered that vegetable material in the nature of grasses, weeds, bracken, husks, leaves, certain tropical vegetable waste and the like matter, mostly regarded as waste material incapable of being used for any useful purpose, can be employed effectively in the manufacture of fuel briquettes, by treating such matter in a pulverized or divided state, with alkali silicate such as sodium or potassium silicate as an agglomerating agent, moulding and pressing the mass into briquettes, and drying the briquettes so formed.

Vegetable matter intended to be included as matter of the above nature comprises grasses of all kinds including elephant grass, non-mucilaginous sea-weeds, such as those of Australia and the Tunis Coast; Nile and other river sudds, the refuse of cotton, paper, rice husking and sugar cane crushing mills; bracken, flax, straw, dry leaves, the shells of cocoanuts and other nuts, bamboo and the tropical vegetable matter *Costos afer* and *Dracaena fragrans*, and mixtures of these.

My invention may, therefore, be said to consist in incorporating alkali silicate, such as silicate of soda, potash and the like with sub-divided vegetable matter in the nature of grasses, weeds, bracken, husks, leaves, certain tropical vegetable waste matter and the like, and after moulding the resulting mass into briquettes of any suitable shape, drying said briquettes to effect the desired hardening thereof.

The invention also includes the agglomeration with alkali silicate of a mixture of any of the above vegetable matters.

According to the invention, moreover, the above mentioned sub-divided vegetable matter may be first carbonized and the alkali silicate may then be incorporated with the carbonized products for subsequent moulding and drying. As a modification said vegetable matter may be mixed with the carbonized products of other matter such as mineral matter and the sodium or potassium silicate added for agglomerating purposes as above set forth, while further the carbonized products of said vegetable matter may be mixed with the carbonized products of said other matter for subsequent agglomeration with alkali silicate as above set forth.

The carbon products obtained by subjecting finely divided coal, coal refuse or dust, finely divided lignite, cannel coal and the like to a process of carbonization such as described in my United States Patent No. 1,501,111, are examples of some of the carbon products derived from mineral matter, which are suitable for addition to the vegetable matter or to the carbonized products obtained from the vegetable matter.

The silicate may be added to the mass, either in the form of a powder or as a solution. Sodium silicate $Na_2Si_4O_9$ may be used, although the sodium silicate $Na_2SiO_3$ is found to be eminently satisfactory for the purpose.

The briquettes when so formed of raw vegetable material, may be used as fuel in a furnace, carbonization taking place in the furnace. The briquettes when heated in the furnace become hard, carbonize and reach and are maintained for a long period at a state of incandescence without desintegrating.

When carbonized products are to be used as an alternative to the raw divided vegetable matter, the said vegetable matter is subjected to a process of carbonization such as that described in my United States Patent No. 1,501,111, aforesaid, the silicate solution then being incorporated with the resulting carbon product, and the mass formed into briquettes as above described prior to actual consumption in the furnace.

In carrying out the invention according to one example in its application to the production of fuel briquettes from raw vegetable matter such as elephant grass, Nile or other sudds, sugar cane waste or other of the vegetable products before referred to, said matter, if not already in a finely divided state, is ground, sieved, pulverized or otherwise treated to bring it into such state, and sodium silicate $Na_2SiO_3$ is then thoroughly incorporated with the mass.

The silicate may be used in powdered form, or in the form of a solution, as desired, and it may be either mixed with the vegetable mass, or blown into the same by means of air pressure or steam.

The divided raw vegetable material, to which may be added the carbonized products of mineral matter, may be moistened to any desired degree either by the injection of steam or the addition of water, and then impregnated with the silicate of soda, either in its powder form or when in solution.

A 1% to 3% solution of the silicate forms a satisfactory medium for the purpose.

When used in the form of a solution, the silicate is thoroughly incorporated with the ground vegetable matter, so that the said solution is, as far as possible, distributed throughout the vegetable matter to damp it, the proportion of silicate solution varying according to the absorbent qualities of the material under treatment.

The respective proportions selected are such as to ensure a perfect binding or agglomeration.

I have found by experiment that in general the addition of about 3% to 7½% of the silicate of soda results in a satisfactory product.

It is also found that a silicate of soda in the nature of $Na_2O$ ... 20.5%, $SiO_2$ ... 59.5% is most suitable for use in the powdered form, whereas one of the nature of $Na_2O$ ... 9.5% $SiO_2$ ... 30.5% is suitable for use in the form of a solution.

The treated vegetable matter is then moulded under pressure into briquettes; for instance, by placing it in moulds and pressing it into solid blocks by hand or power driven presses.

According to a second example of carrying out the invention, the divided vegetable matter is first carbonized by the process described in my United States Patent No. 1,501,111, and the silicate solution is mixed with the carbonized products, to which may be added, if desired, carbonized products of mineral matter, obtained as described in the above mentioned patent, the mass then being formed into briquettes of any convenient shape and size.

The briquettes produced as described in either example are dried, either at a normal temperature by exposure to air, or more rapidly by subjecting them to heat, for instance, in an oven, whereupon they are ready for use as fuel, their ultimate dryness and solidification being determined by the original amount of moisture they contained after leaving the press mould.

Whether the briquettes are made of raw material, as in the first example, or of carbonized material, as in the second example, they may be subjected to incandescent heat in a furnace. Thus, when the raw material is employed the briquettes formed by agglomeration of said material become carbonized in the furnace, which may be the furnace in which they are to be used as fuel.

The briquettes, whether formed of the carbonized or of the raw material take the form of hard compact bodies eminently suitable for fuel.

In the case of briquettes of raw material the moulded briquettes should be placed amidst the incandescent embers of the furnace—it being found that they then retain their shape—whereupon solidification and then carbonization takes place, and a fuel in the form of incandescent briquettes is thus produced in situ as it were in the furnace itself.

By producing in this way a carbon fuel, at incandescence, in the furnace itself, great economy as regards time and expense is obtained.

I claim:

A fuel briquette composed of finely-divided carbonized vegetable matter in the form of grasses, weeds, leaves, tropical waste and sea weeds, together with a binding agent of sodium silicate.

In testimony whereof I have signed my name to this specification.

ALICE MARION HART.